UNITED STATES PATENT OFFICE.

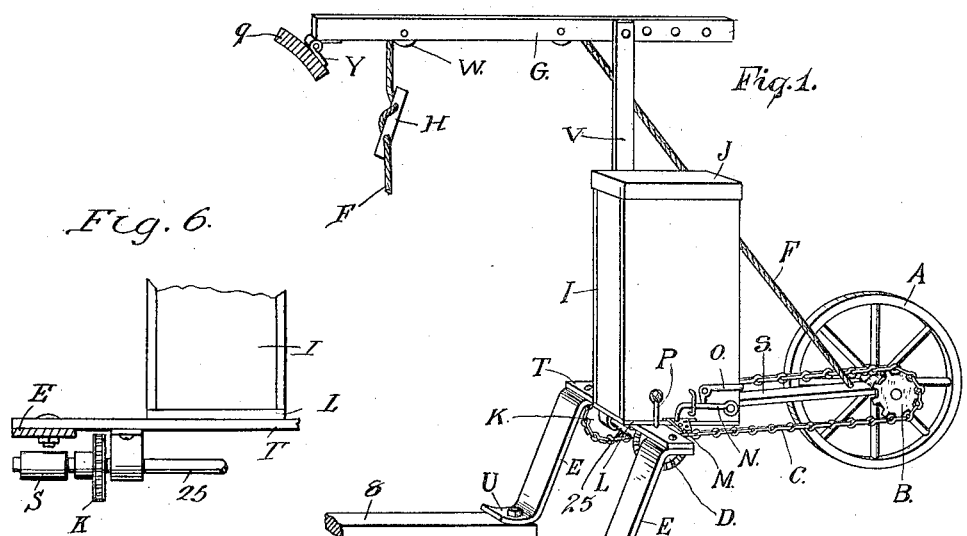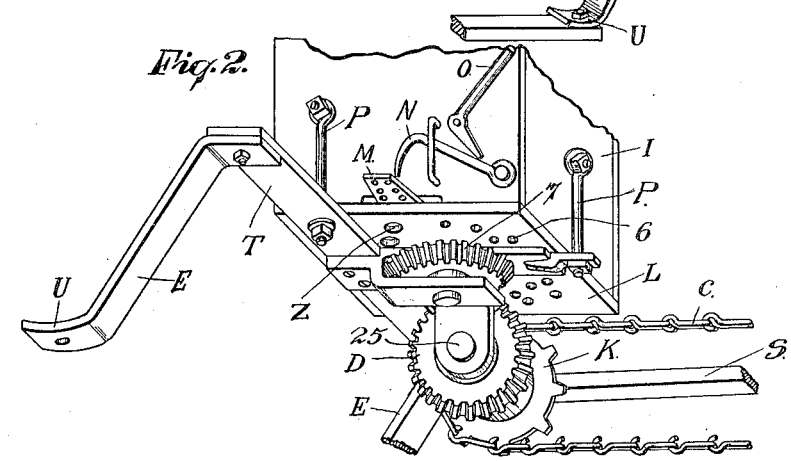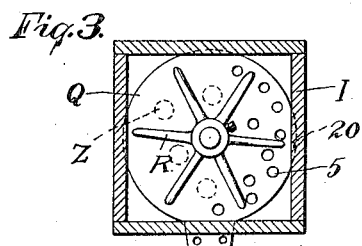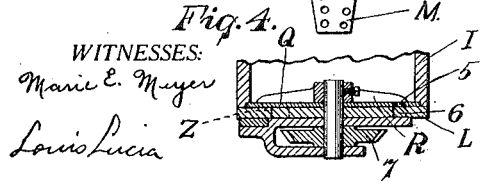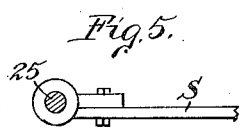

WILLIAM R. BUCK, OF NEW MILFORD, CONNECTICUT.

DISTRIBUTER.

1,104,342.   Specification of Letters Patent.   Patented July 21, 1914.

Application filed March 22, 1913. Serial No. 756,128.

*To all whom it may concern:*

Be it known that I, WILLIAM R. BUCK, a citizen of the United States, and a resident of New Milford, in the county of Litchfield and State of Connecticut, have invented a new and Improved Distributer, of which the following is a specification.

My invention relates more especially to the class of devices employed for distributing or sowing seed, fertilizer, poison, &c., for agricultural purposes, and an object of my invention, among others, is to produce a device of this class that may be readily attached to agricultural machines in common use, and one that may be readily manipulated for the purpose required, and one that shall be extremely effective in its results.

One form of machine embodying my invention and in the construction and use of which the objects hereinabove set out, as well as others, may be attained, is illustrated in the accompanying drawings, in which—

Figure 1 is a detail perspective view of my improved distributer. Fig. 2 is a detail perspective view, on enlarged scale, showing the lower end of the receiver, and mechanism attached thereto. Fig. 3 is a detail view illustrating the agitator and distributing plate. Fig. 4 is a detail view showing the arrangement of the lower end of the hopper and the mechanism mounted thereon. Fig. 5 is a detail view showing the pivotal connection of the reach arm. Fig. 6 is a detail view in front elevation of a portion of my improved distributer, showing the means of attachment of the reach arm to the driving shaft.

While my improved machine may be put to various uses for agricultural purposes, as it is especially adapted for distributing Paris-green mixed with middlings for the destruction of worms common to tobacco plants, I have shown it herein as especially adapted for attachment to tobacco setting machines.

In the accompanying drawings the letters E denote brackets that are especially adapted for attachment to the runners 8 of a planter or tobacco setting machine immediately back of the seats of the operators, these brackets having feet U, which are attached directly to said runner. These feet are curved as to that surface resting in contact with the runners, as shown in Fig. 1 of the drawings, these feet having openings for the reception of bolts by means of which the brackets are movably and removably secured in place, the curved surfaces permitting the brackets to have a rocking movement upon their supports. A cross piece T is secured to and unites the upper ends of the brackets, this cross piece being pivotally secured to the brackets as by means of bolts passing through the parts forming a pivotal connection upon which the bracket may turn to permit their lower ends to be placed in different relative positions and thus enable the device to be secured to machines in which the runners may be located at various distances apart. A receptacle I is secured to the cross piece T in any suitable manner, as herein shown by eye-bolts P attached to bolts on the receptacle passing through the cross piece and secured as by means of nuts on their lower ends. This receptacle may be of any desired shape suitable to contain the material to be distributed, and it has a lid J for closing the upper end.

The bottom L of the receptacle constitutes a sower plate having discharge openings arranged in any suitable manner for the passage of material from the receptacle. The sides of the receptacle are cut away at their lower ends to form recesses 20 next to the sower plate within which recesses the edge of a valve plate Q is located, this valve plate having openings 5 arranged preferably at one side of its center to register with openings 6 in the sower plate or bottom of the receptacle, said valve plate being unperforated on the opposite side of its center. The sower plate is also provided with clearance holes Z located on the diametrically opposite side of the plate from the openings 6 by means of which material which may lodge between the plates may pass, thus clearing the space between the plates. The valve plate has a projection M extending through the side of the receptacle and by means of which the plate may be adjusted to regulate the amount of flow of material from the receptacle.

An agitator R is rotatably mounted in the bottom of the receptacle and has a bevel pinion 7 meshing with a bevel gear D on a driving shaft 25 mounted in bearings underneath the receptacle, this driving shaft having a sprocket wheel K to receive a sprocket chain C extending to a sprocket wheel B secured to the shaft of a floating or drive wheel A rotatably mounted in a floating or reach arm S pivotally secured to the drive shaft mounted underneath the receptacle. A hoisting rope F extends from the reach arm S over sheaves W mounted on a supporting bar G pivotally secured in any desired position on the machine to which my improved device is attached, in the special construction herein shown, a hinge Y being employed and secured to the water barrel 9 of the planter or tobacco setting machine, which barrel constitutes a part of said machine. The bar G is pivotally attached to a post or support V secured to the receptacle I.

It will be noted from this construction that the receptacle being mounted on the brackets E may have a rocking motion on the runner supports of the machine and the bar G being pivotally attached to the machine, an extremely efficient apparatus is provided whereby my improved attachment may readily accommodate itself to all the various conditions and uses, and the attachment may readily move to suit these various conditions. When the apparatus is not in use the floating drive wheel A may be hoisted to an elevated position clear from the ground. A weight H may be adjustably attached to the rope F as an aid in hoisting the drive wheel and also to relieve the drive wheel of excessive weight and allow it to remain in contact with the ground with just sufficient friction to drive the shafts B and D. The projection M is provided with holes arranged in any position that may be desired to receive a locking hook N pivotally secured to the side of the receptacle with its end in position to engage any of said holes that may be desired thus permitting the openings 5 and 6 to register to a greater or lesser degree and permit slower or faster flow of material from the receptacle. A locking lever O is also pivotally attached to the side of the machine to hold the locking hook in engagement with the projection M.

It will be noted from this construction that material, as middlings and Paris-green mixed, being placed in the receptacle and the device being attached to the runners of a tobacco setting machine, that as the setting machine is moved over the ground my improved attachment will move yieldingly to accommodate itself to various conditions caused by unevenness of the ground over which the machine is moved, and that the amount of material distributed over the ground may be regulated to any desired extent, the material within the receptacle being effectually agitated to cause it to flow out from the receptacle. I thus provide means for distributing such material at the time of the setting of the plants, which material will effectually destroy worms especially injurious to the young plants, the Paris-green being mixed with bran middlings, the worms being especially fond of this latter material. It, of course, will be understood that the apparatus may be employed for setting any other plants that may be desired. The attachment is also of such construction that it will occupy but little space in addition to the machine to which it is attached, and is therefore especially desirable for this reason.

I do not limit my invention to the exact construction herein shown and described as this may be departed from to a greater or lesser extent and yet be within the spirit and intent of the invention.

I claim—

1. A distributing apparatus including brackets, means for removably attaching the brackets to a planter, a cross piece, means for attaching the cross piece to the brackets to permit adjustment of the opposite ends of the brackets toward and from each other, a receptacle mounted on the cross piece, a reach arm, a drive wheel mounted on said arm, an agitator mounted in the receptacle, a driving connection between said drive wheel and agitator, and means for controlling the outflow of material from said receptacle.

2. In a distributing apparatus, a bracket having a foot with a curved bearing surface, means for loosely attaching said foot to a planter, a receptacle mounted on the bracket, an agitator located in the receptacle, a reach arm pivotally attached to the receptacle, a drive wheel rotatably mounted in the reach arm, and a driving connection between said drive wheel and the agitator.

3. In a distributing apparatus, a receiver having its side parts recessed at the bottom ends thereof, a distributing plate secured to the bottom of the receiver against said ends to form one side of said recesses, said distributing plate having openings, a valve plate pivotally mounted on the upper surface of said distributing plate and having its edges located in said recesses, and means for operating the valve plate.

4. A distributing apparatus formed as a unit and including a bracket having means for movably and removably attaching it to a planter, and a structure carried by the bracket and including a receptacle mounted on the bracket, a reach arm pivotally supported by the bracket, a drive wheel rotatably mounted on the reach arm, a support rigidly secured to said structure, a supporting bar having means for pivotally attaching it to the planter, means for pivotally attaching said supporting bar and said support together, and a hoisting member secured to the reach arm and supported upon said bar upon which it is moved to hoist the reach arm.

5. In combination in a distributing apparatus, a receptacle, a bottom therefor constituting a sower plate having discharge openings on one side thereof and clearance openings on its other side, a valve plate mounted on the sower plate and having openings on one side to register with the discharge openings in the sower plate, said valve plate being unperforated on its opposite side, an agitator located in the bottom of the receptacle, and means for rotating the agitator.

WILLIAM R. BUCK.

Witnesses:
  WILLIAM J. KIEFER,
  JOHN S. ADDIS.